United States Patent [19]
Takada

[11] 4,451,061
[45] May 29, 1984

[54] BELT TRANSFER ARRANGEMENT FOR A PASSIVE VEHICLE RESTRAINT BELT SYSTEM

[76] Inventor: Juichiro Takada, 3-12-1, Shinmachi, Setagayakuku, Tokyo, Japan

[21] Appl. No.: 334,984

[22] Filed: Dec. 28, 1981

Related U.S. Application Data

[62] Division of Ser. No. 118,841, Feb. 5, 1980, abandoned.

[30] Foreign Application Priority Data

Mar. 6, 1979 [JP] Japan .................................. 54-27531
Mar. 24, 1979 [JP] Japan .................................. 54-37409

[51] Int. Cl.³ ............................................. B60R 21/10
[52] U.S. Cl. ..................................... 280/802; 297/469
[58] Field of Search ...................... 280/802, 803, 804; 180/286; 297/469; 74/502

[56] References Cited

U.S. PATENT DOCUMENTS

| | | | |
|---|---|---|---|
| 3,743,047 | 7/1973 | Dapolito | 180/286 |
| 4,040,645 | 8/1977 | Giffen et al. | 280/803 |
| 4,213,637 | 7/1980 | Mavron | 280/802 |
| 4,225,154 | 9/1980 | Takada | 280/804 |
| 4,257,625 | 3/1981 | Takada | 280/804 |

FOREIGN PATENT DOCUMENTS

| | | | |
|---|---|---|---|
| 695781 | 12/1930 | France | 180/286 |
| 2053661 | 2/1981 | United Kingdom | 280/802 |

*Primary Examiner*—Joseph F. Peters, Jr.
*Assistant Examiner*—Ross Weaver
*Attorney, Agent, or Firm*—Brumbaugh, Graves, Donohue & Raymond

[57] ABSTRACT

A belt transfer arrangement for a passive vehicle restraint belt system includes a pivoting arm mounted on the inboard side of the vehicle seat and carrying a guide ring at its upper end through which a restraint belt freely passes. A motion transfer device coupled between the arm and the vehicle door shifts the arm between a rearward, restraint position and a forward, release position in response to movement of the door between the closed and partly open positions. The transfer device includes a drive wire contained within a wire sheath that is fastened at both ends and constrains the wire for motion transfer. A lost-motion coupling that enables the door to be moved between the partly open and fully open positions without substantial movement of the arm is interposed between the door and the pivoting arm.

3 Claims, 16 Drawing Figures

BELT TRANSFER ARRANGEMENT FOR A PASSIVE VEHICLE RESTRAINT BELT SYSTEM

This is a division of application Ser. No. 118,841, filed Feb. 5, 1980, now abandoned.

BACKGROUND OF THE INVENTION

This invention relates to an improvement in a passive vehicle restraint belt system that shifts the belt between an occupant restraining position and an occupant releasing position automatically in response to opening and closing movements of the vehicle door.

DESCRIPTION OF THE PRIOR ART

A variety of passive restraint belt systems have been proposed in which a belt guide is moved along a guide rail at the edge of the roof or on the inside of the door by electrical or mechanical means. Many of those systems are complex and expensive and require frequent maintenance and repair. In a relatively simple system, on the other hand, the inboard end portion is wound on a retractor and the outboard, free end is fastened to the rear portion of the door. When the door is opened, the belt is pulled forward releasing the occupant. However, when the belt pulls out as the door opens and the occupant gets out of the vehicle, the seat belt rubs against his waist or abdomen, because the belt never completely clears his body. One proposed solution of the rubbing problem and the accompanying inconvenience to the occupant during his entry and departure utilizes a guide ring on an oscillating arm that moves the belt forward and back. This apparatus, described in Japanese patent publication No. 42922/1978, comprises a switch for detecting movement of the door, a motor to drive the oscillating arm, and a control circuit for the motor. This arrangement has the disadvantages of high cost and consumption of electrical power.

SUMMARY OF THE INVENTION

To overcome the drawbacks of these prior art devices, there is provided, according to the present invention, a belt transfer arrangement using the motion of the door for operation. The system comprises an arm mounted on the inboard side of the vehicle seat and having a guide ring on its upper end through which a restraint belt freely passes. The arm moves between a rearward position, adjacent the back of the seat, and a forward position, in response to movement of the door between the closed position and a partway open position. A motion transfer device coupled between the arm and the vehicle door moves the arm in response to motion of the door. The transfer device includes a drive wire contained in a wire sheath that is fastened at both ends to constrain the wire for motion transfer. A lost-motion coupling contained in the transfer means enables the door to be moved between the partway open position to the fully open position without substantially moving the arm.

One form of lost-motion coupling includes a "V"-shaped slot on the arm which receives a roller and pin on the drive wire. When the door moves from the closed position to the partway open position, the roller and pin is at the end of one leg of the "V," allowing the wire to transfer the motion of the door to the arm. When the door reaches the partway open position, the roller has moved along the first leg and into the other leg of the "V;" between the partway and fully opened positions of the door, the pin moves in the second leg of the "V" without transferring door motion to the arm. This embodiment may further comprise a spring interposed in the transfer device to urge the arm towards the rearward, restraint position.

In a variation of this embodiment, a guide tube affixed to the vehicle door slidably receives the wire sheath. When the door moves, the wire sheath slides within the tube, which protects and constrains the sheath and wire.

Various other lost-motion devices can be used, such as one comprising a rod connected to the drive wire and slidably mounted on the door or the vehicle body, near the juncture of the door and the door frame, and adapted to move relative to the fixed sheath. When the door moves between the closed position and the partway open position, motion is imparted to the drive wire by the rod. There are two variations of this embodiment. In one the wire sheath is attached to the vehicle body while the rod is slidably mounted on the door. In the other the sheath is fixed to the door and the rod is slidably mounted on the vehicle body. The operation is similar in both cases.

Another suitable lost-motion coupling comprises a folding linkage connected between the end of the drive wire and door. The folding linkage moves in a substantially folded state, relative to the wire sheath, while the door moves between the closed position and the partway open position. When the door moves beyond the partway open position, the linkage unfolds to absorb the door motion and leaves the wire and a connecting link generally stationary with respect to the wire sheath.

DESCRIPTION OF EXEMPLARY EMBODIMENTS

The various illustrated embodiments of the belt transfer device, according to the present invention, are intended for use in conjunction with a passive belt system of the type in which a shoulder belt B leads from a retractor 20 fastened to the floor of the vehicle 22 below, inboard of and behind an occupant seated on the vehicle seat 24 and extends upwardly and outwardly across the seat 24 to an anchor 26 affixed to the vehicle door 28 near the upper rear corner. The anchor 26 preferably includes a buckle 29 which receives a buckle tongue 30 affixed to the free, outboard end of the belt B. The buckle 29 is intended only for emergency situations and is normally not to be released by the vehicle occupant. When the door is closed, the anchor 26 mates with a reinforcing bracket 32 on the door frame so that the door frame will carry a substantial part of any load exerted by the belt in an emergency situation. Preferably, the shoulder belt B is used in conjunction with an energy absorbing knee pad 34 located under the dashboard. It should be apparent from FIG. 1 that when the door is closed, the belt leads across the vehicle occupant's chest to a position generally above, behind, and outboard of his shoulder, as indicated by the phantom lines in FIG. 1. In this position, the belt restrains the occupant from being thrown forward in the event of a collision, upset, or sudden stop. When the vehicle door is opened, the outboard portion of the belt B moves forward away from the occupant's chest to the release position illustrated in the solid lines of FIG. 1 and is thus in a position which enables the occupant to get into or out of the vehicle. In moving from the closed restraint position to the open release position, the belt B is unwound from the retractor 20, and were it not for the present invention, a part of the belt generally at the inboard side of the occupant would rub against the occupant's body and contribute to inconvenience and possibly discomfort, as well as to possible abrasion of the belt itself. Moreover, if the back of the vehicle seat is folded forward with the door open, the inboard part of the belt interferes with the folding motion of the seat with similar abrasion to both the belt and seat. The present invention solves these problems very effectively.

The belt transfer device shown in FIGS. 1-4 comprises an arm 36 that is mounted on the inboard side of the vehicle seat 24 by a pivot mounting 38 for movement of a guide 40 through which the belt freely passes and which is affixed to the upper end of the arm 36. Alternatively, the arm 36 can be mounted on a center console of the vehicle on the inboard side of the seat or on a floor mounted bracket. A drive wire 42 is attached to the lower end of the arm at a location below the pivot axis and leads through a sheath 44 along a suitable path on the vehicle floor, then up and out of the vehicle body at the front of the door and finally into the door where it is connected to one end of a rod 46. The rod 46 is mounted in the door on suitable guides so that it can move axially with respect to the door 28 toward and away from the frame. The sheath 44 for the wire is, of course, properly affixed; the inboard end near the arm 36 and at the outboard end on the door by retainers 48 and 50, respectively, so that the wire 42 is constrained for transfer of door motion to the arm 36. A spring 52 is compressed between the lower end of the arm 36 and a suitable fixed location forward of the arm on the seat.

Figures 1, 2:
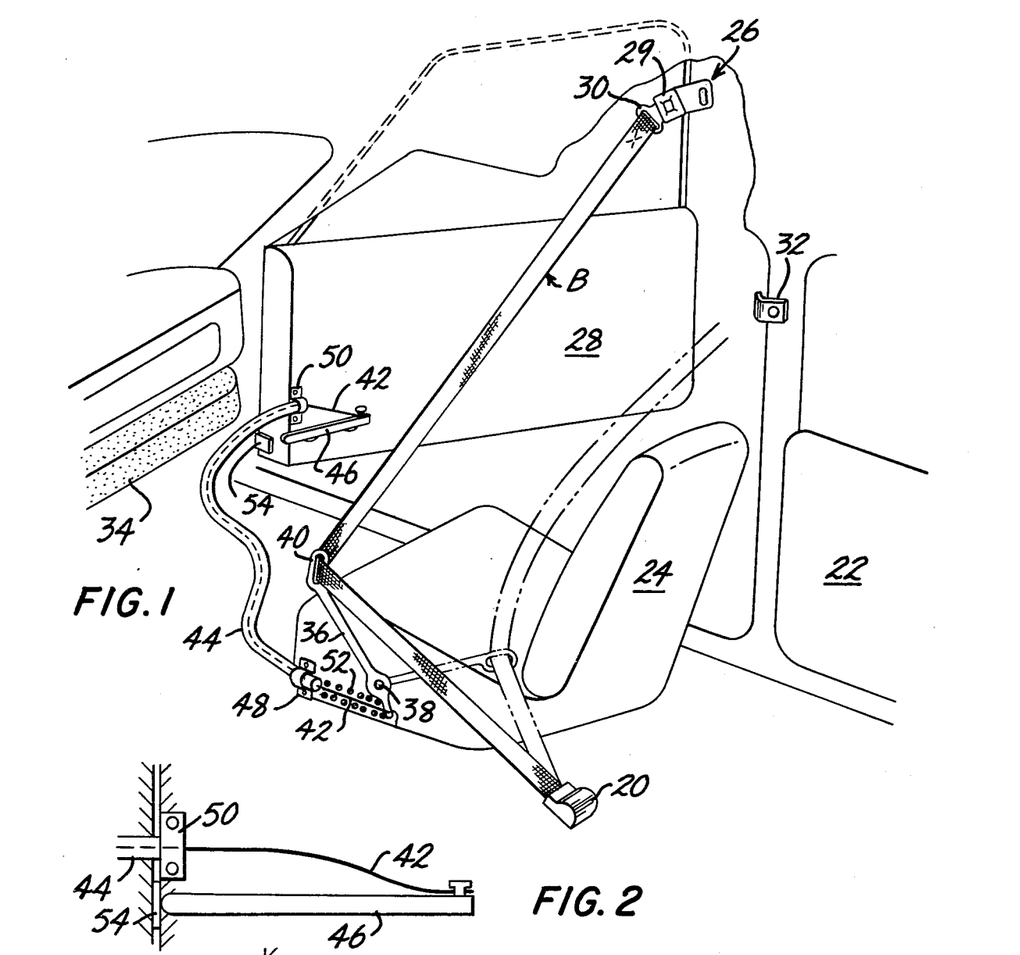
FIG. 1 is a pictorial view of a passive vehicle occupant restraint belt system equipped with one embodiment of the present invention.
FIGS. 2–4 are schematic illustrations of the lost motion coupling used in the belt transfer device shown in FIG. 1 and illustrated in three different positions, namely with the door closed (FIG. 2), the door partway open (FIG. 3) and the door fully open (FIG. 4)
Figure 3:
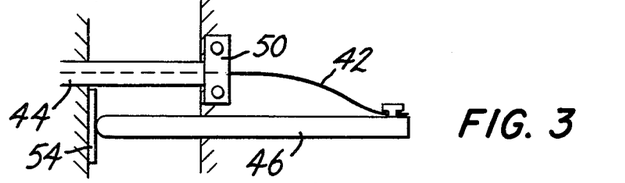
Figure 4:
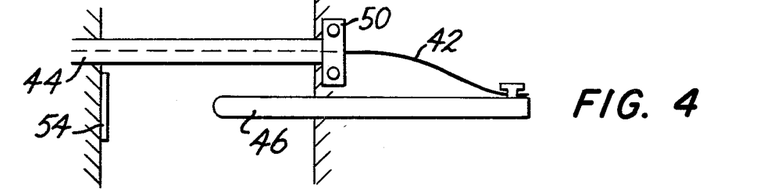

When the vehicle door 28 is closed (see FIG. 2) the rod 46, working against a strike plate 54 on the door frame, is pushed rearwardly relative to the door and pulls the part of the wire that is attached to the lower end of the arm 36 forward, thereby pivoting the arm 36 into the rearward location illustrated by phantom lines in FIG. 1. In that position, the inboard end of the belt B is in the proper position for comfortable and safe restraint of the occupant of the seat. When the door is moved from closed to a partway open position (see FIG. 3), the energy stored in the spring 52 pivots the arm 36 forward into the position shown in solid lines in FIG. 1, such forward motion being permitted through forward sliding of the rod 46 relative to the door 28 as the door is opened. When the door is approximately halfway open, the arm 36 has reached a forward position in which the inboard portion of the belt B is sufficiently in front of the occupant to minimize the obstruction of an occupant entering or departing from the vehicle. In vehicles having folding seat backs, the belt in the forward release position does not interfere with forward folding of the seat back.

A suitable stop associated with the rod 46 or with the arm 36 stops the arm 36 from pivoting forward when the door reaches the partway open position. Therefore when the door is moved from partway to fully open (see FIG. 4), the control rod 46 remains stationary relative to the door (which means that its forward end moves away from the strike plate 54). Meanwhile, the belt remains in the release configuration shown in solid lines FIG. 1, and no motion is transmitted between the door and the belt transfer device during movement of the door between the partway and fully open positions.

The above-described sequence is reversed when the door is moved from fully open to closed—no motion is transmitted from the door to the arm 36 up to the point when the door is partway open, but when the door moves from partway open (FIG. 3) to closed (FIG. 2), the rod 46 engages the strike plate 54 and is pushed rearwardly relative to the door, thereby pulling on the wire 42 and pivoting the arm 36 back to the restraint location.

Figure 5:
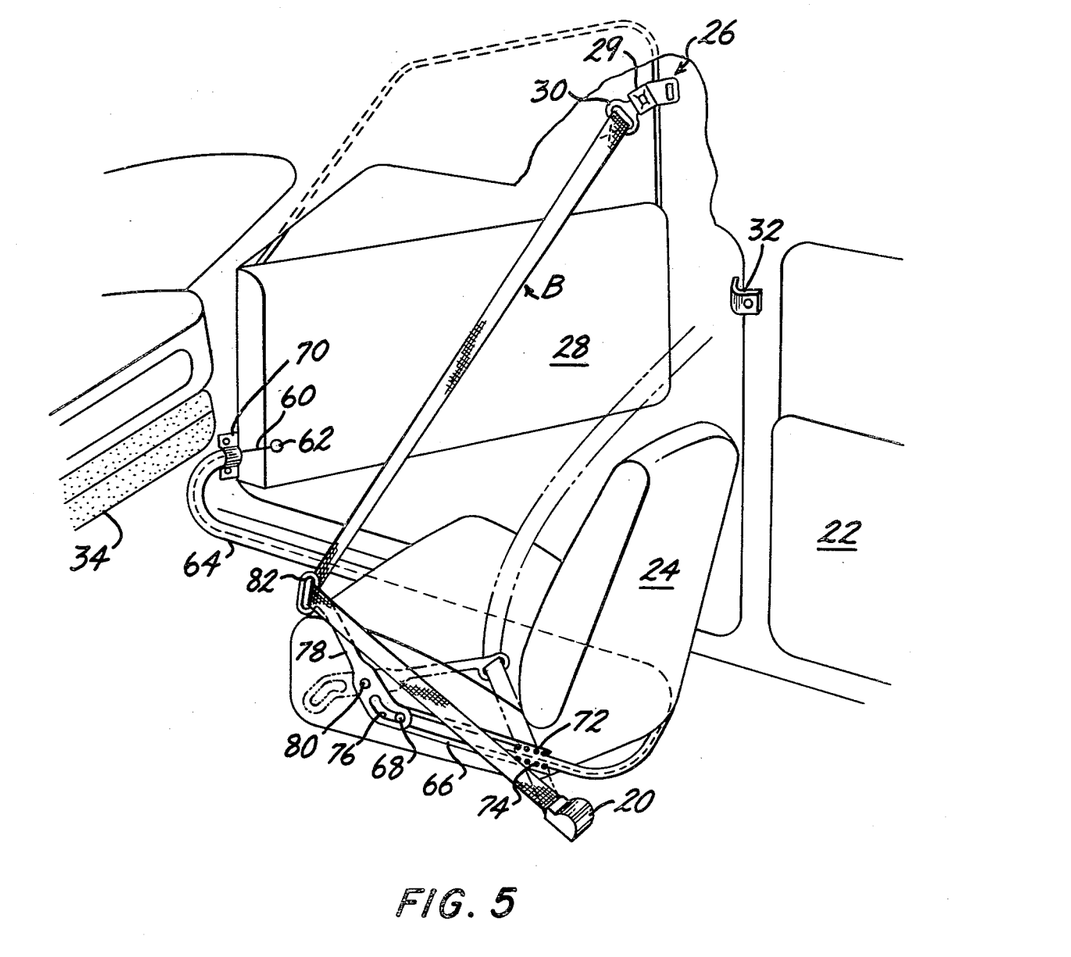
FIG. 5 is a pictorial view of a passive belt system which includes another embodiment of the invention.

The restraint belt system shown in FIG. 5 is identical to that shown in FIG. 1 except for the belt transfer device. The parts of the system shown in FIG. 5 are, accordingly, assigned the same reference numerals and are not re-described. One end of a motion transfer wire 60 is affixed to the door 28 at a location 62 spaced apart from the axis of the door hinges and leads through a sheath 64 to a coupling rod 66 which has a pin and roller 68 at its free end. The outboard end of the sheath 64 is fastened to the vehicle body adjacent the door opening by a retainer 70, and the inboard end is fastened to the rearward end of a guide tube 72 which receives the connecting rod 66. A spring 74 is compressed between the rearward end of the rod 66 and the rod guide tube 72 so that energy is stored in the spring when the rod is in a rearward location in tube 72. The roller 68 on the rod 66 is received in a generally "V"-shaped slot 76 in the lower portion of an arm 78 which is pivotably mounted at by a pivot pin 80 on the inboard side of the vehicle seat and carries a belt guide ring 82 at its upper end.

Figure 6:
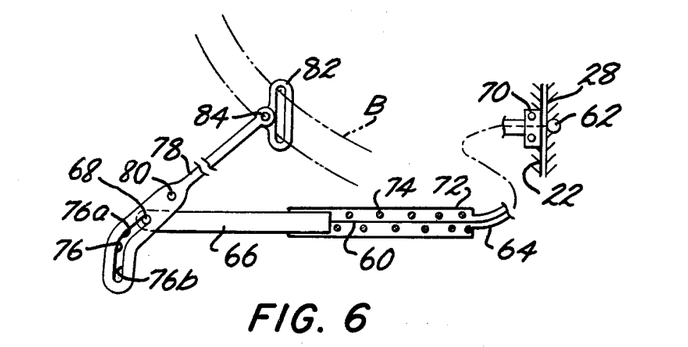
FIGS. 6, 7, and 8 are schematic views of the belt transfer device shown in FIG. 5 in three different phases of operation.

When the door 28 is closed the arm 78 is in a rearward, restraint location near the rear of the vehicle seat 24, and the roller 68 resides in the upper portion 76a of the slot 76, the spring 74 having pushed the rod 66 forward when the door was moved from closed to partway open (see FIG. 6). The door 28 pulls on the wire 60 and the wire 60 transmits motion to the arm 78 via the coupling rod 66 and the roller 68; the orientation of the upper portion 76a of the slot 76 is such that the pin remains at the upper end of the portion 76a until the portion 76a resides approximately vertically. Therefore the door motion is transmitted by the wire to the arm 78 to move the guide 82 at the upper end of the arm forward so that the belt is held in a position some distance forward of the occupant for easy entry to and departure from the vehicle seat 24.

Figure 7:
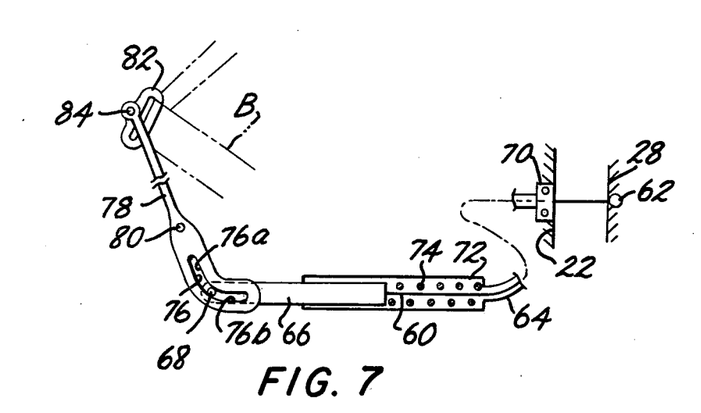
Figure 8:
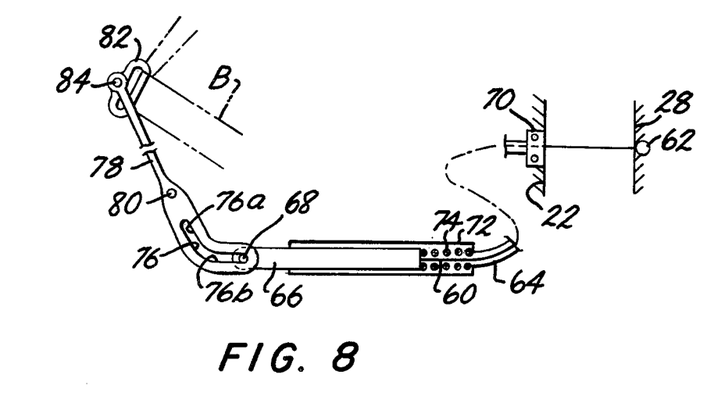

During movement of the door from partway open towards fully open (see FIG. 7), the roller 68 slides down from the upper end of the portion 76a of the slot into the lower portion 76b, which at the time is aligned generally horizontally, so that as the door 28 continues to pull on the wire 60 and retracts the coupling rod 66 into the guide tube 72, the motion of the roller 68 is "lost" by movement through the slot portion 76b, and no additional motion of the arm 78 occurs. The motion of the door from fully open to partly closed is also "lost" by virtue of the lost-motion coupling (the coupling rod 66 and the "V"-shaped slot 76) on the arm, until the roller 68 moves forward through the lower portion of the slot 76b. From the part-way open to the closed position of the door, the spring 74, working in conjunction with the tension in the belt B applied by the retractor 20, pushes on the lower end of the arm 78 via the coupling rod 66 and the roller 68 and restores the arm 78 to the rearward, restraint position illustrated in phantom lines in FIG. 5. The guide ring 82 is mounted on a pivot 84 so that the belt will always lie flat against the slot in all positions of the guide 82 (compare FIGS. 6 and 7, for example).

Figures 9, 10:
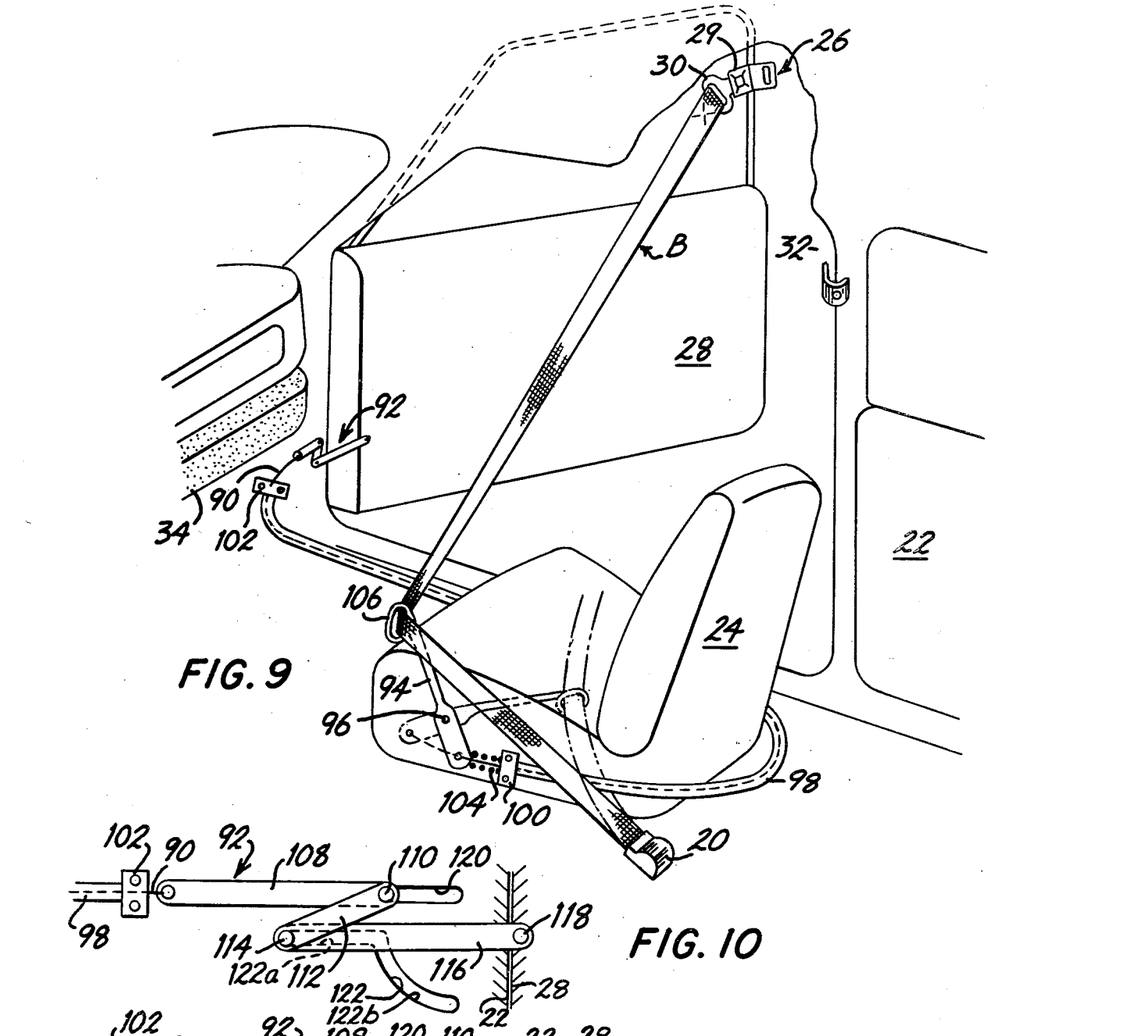
FIG. 9 is a pictorial view of passive belt system which includes another embodiment of the invention.
FIGS. 10, 11, and 12 are schematic views in three different positions of a lost motion coupling used in the embodiment shown in FIG. 9.

The elements of the belt system illustrated in FIG. 9 that correspond to those shown in FIG. 1 are assigned the same reference numerals as used in FIG. 1 and are described above.

The belt transfer device shown in FIGS. 9-12 comprises a motion transfer wire 90, the outboard end of which is connected to a lost-motion coupling 92 near the vehicle door 28 and the inboard end of which is fastened to the lower end of an arm 94 mounted to pivot on a pivot pin 96 on the inboard side of the vehicle seat 24. The wire 90 is constrained for motion transfer by a sheath 98 which is fastened to the inboard side of the seat by an anchor 100 at one end and is fastened at its outboard end to the vehicle body by an anchor 102. A spring 104 is compressed between the lower end of the arm 94 below the pivot pin 96 and a suitable fixed location on the side of the seat, such as the anchor 100. As in the other embodiments, of course, the belt B leads from the retractor 20 through a guide ring 106 attached, preferably by a pivot attachment, to the upper end of the arm 94.

Figure 11:
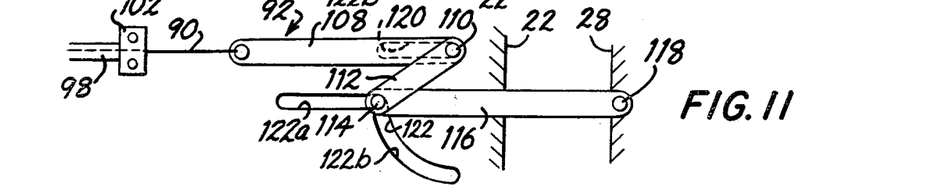
Figure 12:
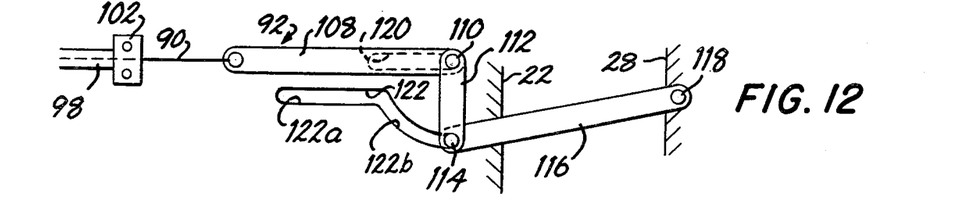
Figure 13:
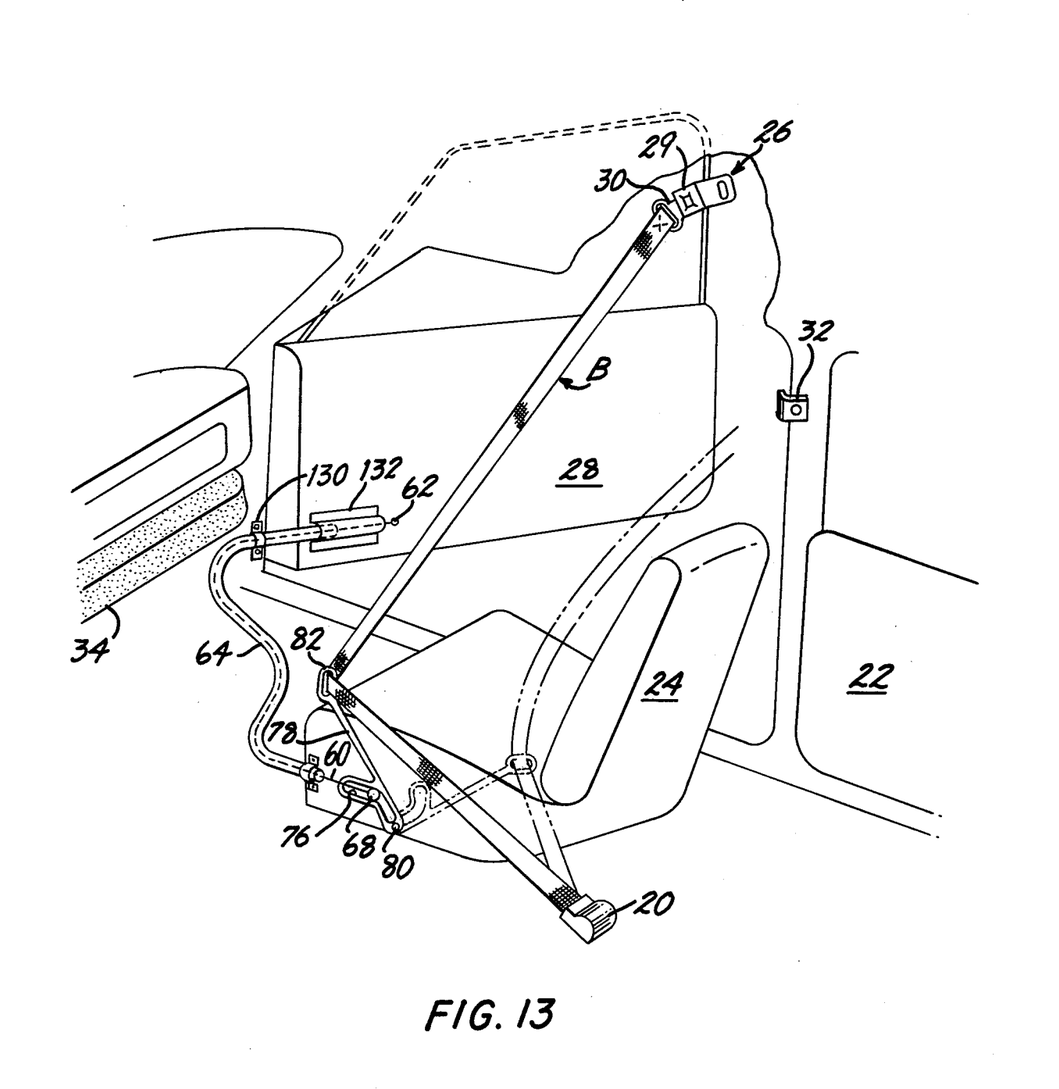
FIG. 13 is a pictorial view of a belt system embodying the present invention and FIGS. 14–16 are schematic views of the belt transfer device shown in FIG. 13 at three different stages.
Figure 14:
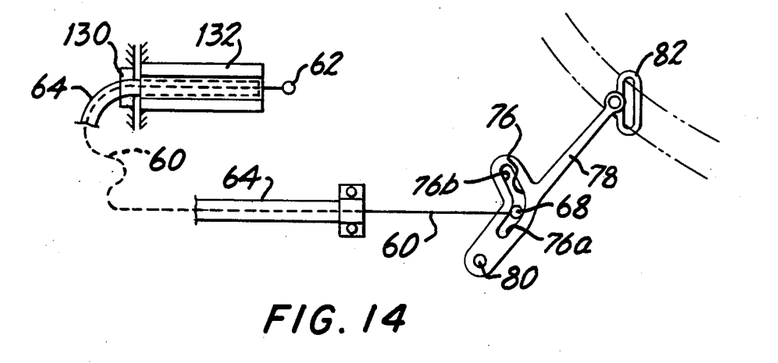

The lost-motion coupling 92 of the embodiment shown in FIG. 9 is illustrated in detail (in generally schematic form) in FIGS. 10-12 and is a folding linkage which consists of a first link 108, the forward end of which is connected to the drive wire 90 and the rearward end of which is coupled by a pin 110 to one end of a second link 112. The other end of the second link 112 is connected by a pivot pin 114 to a third link 116, the opposite or rearward end of which is attached by a universal coupling 118 to the vehicle door 28 at a location spaced apart from the axis of the door hinges so that upon motion of the door the universal coupling 118 moves relative to the vehicle body. The two pivot pins 110 and 114 are guided by tracks such as slots 120 and 122, respectively, in a casing for the folding linkage. The slots 120 and 122 control the folding linkage so that it remains in a folded condition during the motion of the door between closed and partway open so that the motion of the door is transmitted by the linkage to the wire 90. During that motion, the two pins 110 and 114 are guided along paths parallel to each other so that the first and third links 108 and 116 of the linkage move together as a unit connected by the second link 112. In moving from the fully closed position (FIG. 10) to the partway open position (FIG. 11) the motion of the link 116 is transmitted directly via the links 112 and 108 through the drive wire 90, and the portion of the wire connected to the lower end of the arm 94 is pulled rearwardly, thereby pivoting the arm 94 to the restraint position shown in phantom lines in FIG. 9 to the forward release position shown in solid lines in FIG 9. At this point the pins 110 and 114 have reached the rearward most position in the slot 120 and the horizontal portion 122A of the slot 122 (see FIG. 11). If the door 28 is pushed from the partway open position towards the fully open position, no additional motion is transmitted to the link 108, and the additional motion of the door relative to the vehicle body is "lost" by unfolding of the linkage under the control of the slot 122. As the linkage unfolds, the pin 114 moves along an arcuate portion 122b of the slot 122, the center of curvature of which is coincident with the axis of the pivot pin 112 when the pin 110 is located at the rearward end of the slot 120. Thus the folding linkage 92 does not transmit any motion to the wire when the door is moved between partway and fully-open positions. Motion of the door from fully-open to partway open (from the position of FIG. 12 to the position of FIG. 11) is "lost" in the form of refolding of the linkage, from which point on (as the door moves from partly closed to fully closed) the door motion is transmitted through the linkage to the wire. More precisely, the force of the spring 104 and the force of the retractor supply tension to the belt, pulling the wire 90 in a direction such that the inboard end, where the wire is attached to the arm 94, is pulled forward as the arm pivots from the release position back to the restraint position shown in FIG. 9.

The embodiment shown in FIGS. 13 to 16 is similar in many respects to the embodiment shown in FIGS. 5-8. Accordingly, corresponding elements of the embodiment of FIGS. 13-16 are assigned the same reference numerals as the ones shown in FIGS. 5-8. The principal difference between the two embodiments involves the relocation of the control slot 76 on the control arm to a position above the pivot axis 80 on the arm 78. This difference makes it possible, in turn to eliminate the coupling rod 66, the guide tubes 72, and the spring 74, and also reverses the direction of the pulling motion of the inboard end of the wire (where it is coupled to the arm from rearward to forward) so that a much shorter cable (the wire 60 and the sheath 64) can be used. When the wire 60 is pulled as the door is moved from fully-closed to partway open (see FIGS. 14 and 15), the door motion is transmitted by the wire 60 to the control slot 76 on the arm 78 until the lower portion 76A passes beyond the vertical to a slightly forward inclination. The arm 78, thus being pivoted, moves the belt guide 82 to a forward, releasing position (solid lines in FIG. 13). Further motion of the door from a partway open position (FIG. 15) is "lost" in the movement of the roller 68 at the inboard end of the wire 60 along the second portion 76b of the control slot. When the door is moved from fully open back to fully closed, the force on the belt applied by the retractor 20 pivots the arm 78 rearwardly to the extent permitted by the drive wire 60. If necessary, a spring can be connected in tension between the arm 78 and a location on the seat rearwardly of the arm to supplement the force of the retractor.

Figure 15:
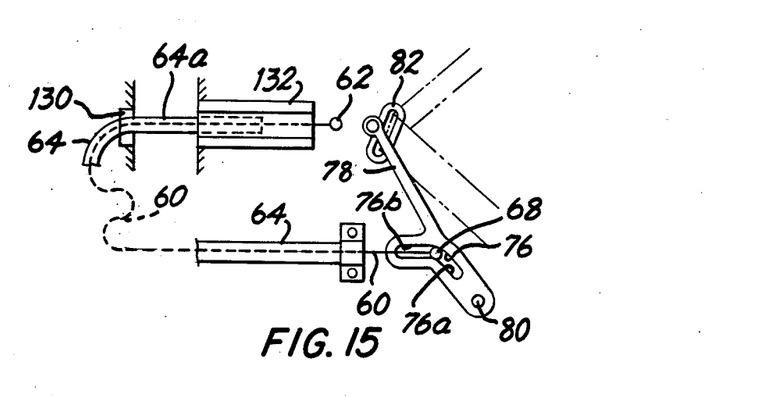
Figure 16:
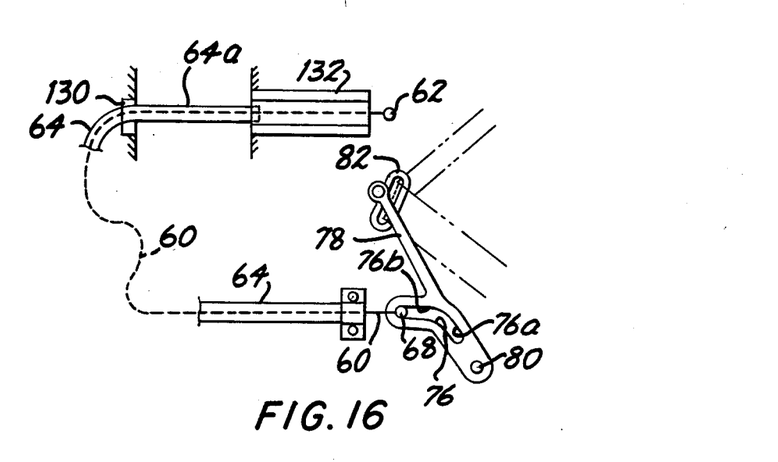

The embodiments of FIGS. 13 to 16 also includes further refinement of the drive part of the belt transfer device. The drive wire sheath 64 is affixed to the vehicle body at a location adjacent the door frame by an anchor 130, but the sheath extends out from the door frame and onto the door where it is received by a guide tube 132 with sufficient clearance between the tube 132 and the sheath to allow the sheath to move freely in the guide tube 132. Accordingly, when the door is open, regardless of the extent, as shown in FIGS. 15 and 16, the portion of the wire 60 where it bridges the gap between the door frame and the door 28 is concealed and protected by the portion 64a of the sheath which moves in and out of the guide tube 132.

Thus, there is provided, in accordance with the present invention, a belt transfer device, which moves the inboard portion of a belt from a rearward restraint position when the door is closed to a forward release position when the door is only partway open. Accordingly, if for some reason the door cannot be fully opened to allow a passenger to enter or leave it (which frequently occurs when the vehicle is parked alongside another vehicle), entry and departure of the occupant are nonetheless facilitated by full transfer of the inboard portion of the belt to the release position. Nonetheless, the invention permits the door to be moved between partway and fully open without any additional transfer of the inboard part of the belt by virtue of lost motion in the drive arrangement. The invention operates automatically in response to door opening and closing motion and uses the door motion rather than motors and controls of the type commonly used in prior art systems.

The above described embodiments of the invention are merely exemplary, and numerous variations and modifications will be readily apparent to those skilled in the art without departing from the spirit and scope of the invention. All such variations and modifications are intended to be included in the scope of the invention, and in the claims.

I claim:

1. A belt transfer arrangement for use in a passive vehicle restraint belt system comprising an arm mounted adjacent the inboard side of the vehicle seat for rotation about a pivot axis for movement of its upper end between a rearward restraining position adjacent the back of the seat and a forward releasing position, and having a guide ring adjacent its upper end through which a restraint belt freely passes, and transfer means coupled between the arm and the vehicle door for moving the upper end of the arm between the rearward position and the forward position in response to movement of the door between the closed position and a partway open position, and including a drive wire coupled between the vehicle door and the arm for transmitting door motion to the arm, a wire sheath slidably receiving the wire and fastened at both of its ends to constrain the wire for motion transfer, a spring means compressed, when the arm is in the rearward restraining position, between a lower end of the arm beneath its pivot axis and a fixed location on the seat forward of the arm, and a lost motion coupling for enabling the door to be moved between the partway open position and a fully open position without imparting further movement to the arm, the lost motion coupling comprising a rod connected to the end of the drive wire and adapted to move the drive wire relative to the wire sheath while the door moves between the closed position and the partway open position, the rod being slidably mounted on the door and the end of the wire sheath near the rod being fastened to the door, wherein when the door is moved from the closed position to the partway open position the spring means moves the arm into the forward releasing position, and wherein when the door is moved from the partway open position to the closed position the rod pulls the wire against the operation of the spring means to move the arm into the rearward restraining position.

2. A belt transfer arrangement as set forth in claim 1 wherein one end of the belt is attached to a fixed terminus and the other end to a spring-loaded retractor that stores excess length of the belt and keeps the belt in tension.

3. A belt transfer arrangement as set forth in claim 1 wherein the guide ring is rotatably supported on the arm for self-positioning to conform to the orientation of the belt.

* * * * *